Nov. 17, 1925.
G. SAVARD ET AL
1,561,800
RAT TRAP
Filed May 17, 1924     3 Sheets-Sheet 1
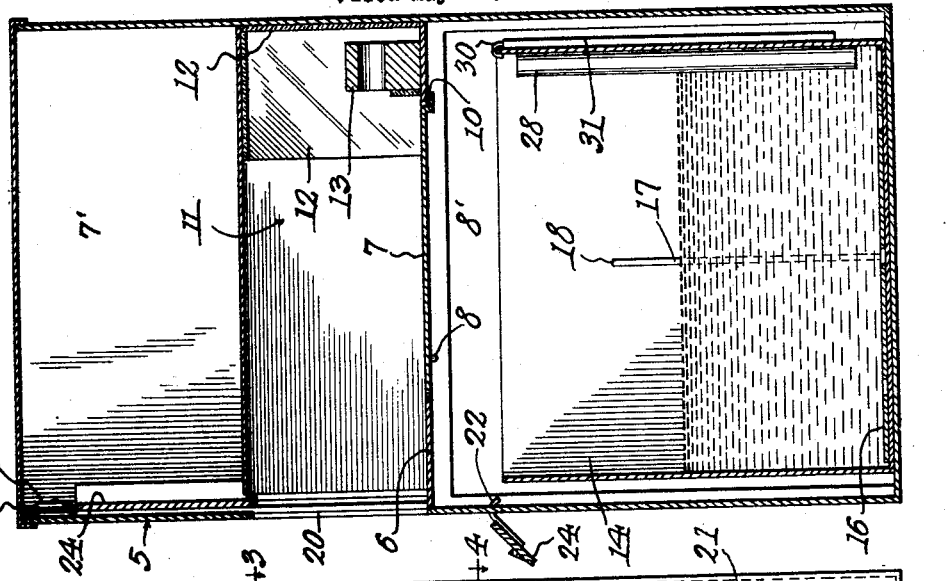
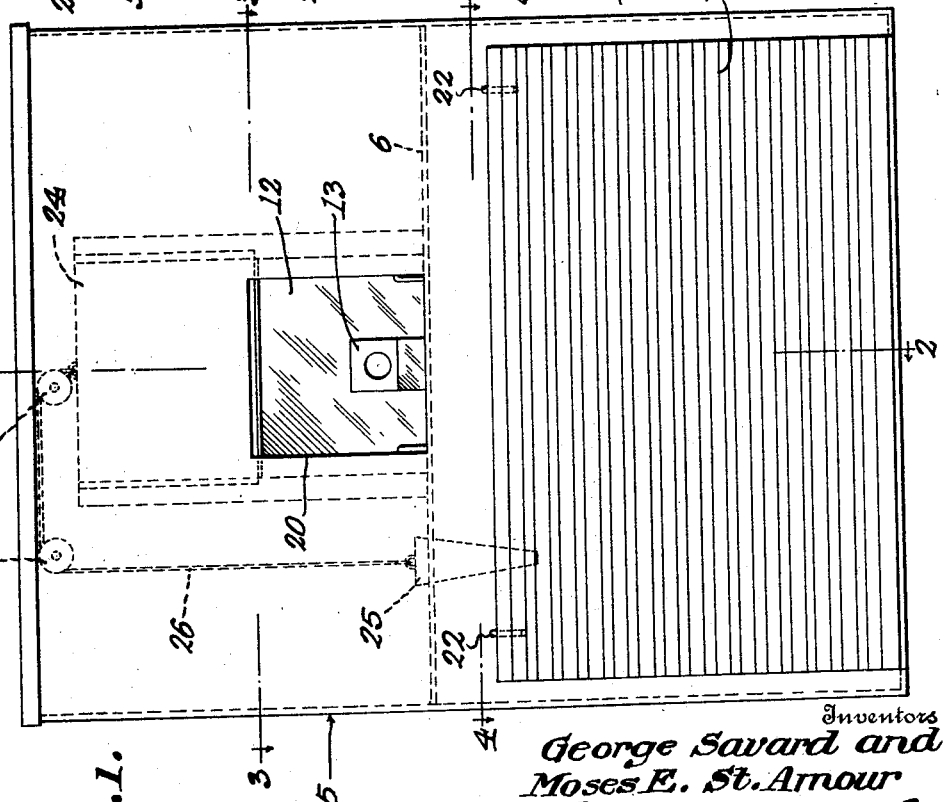
Inventors
George Savard and
Moses E. St. Amour

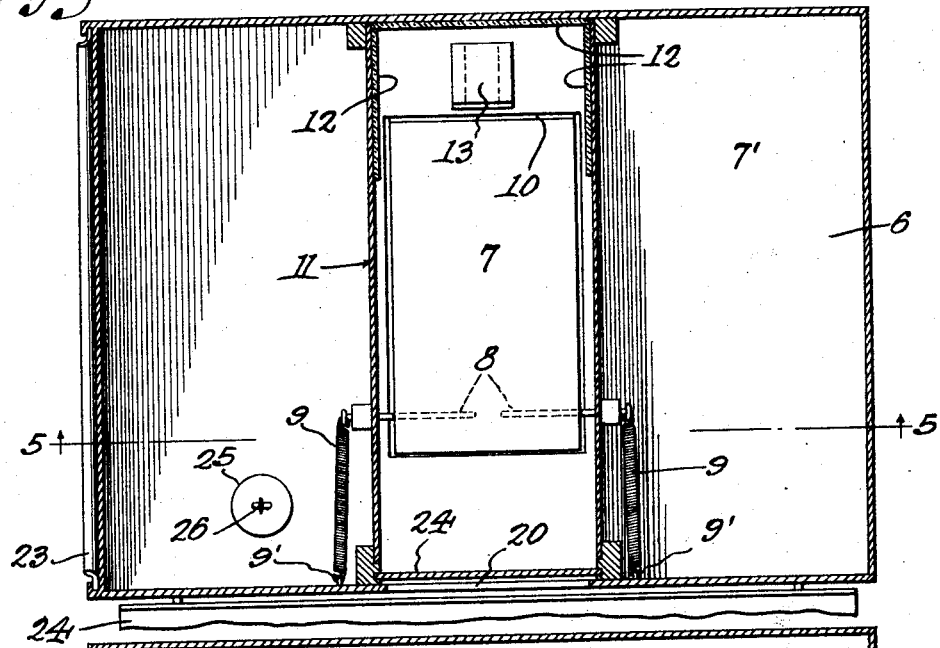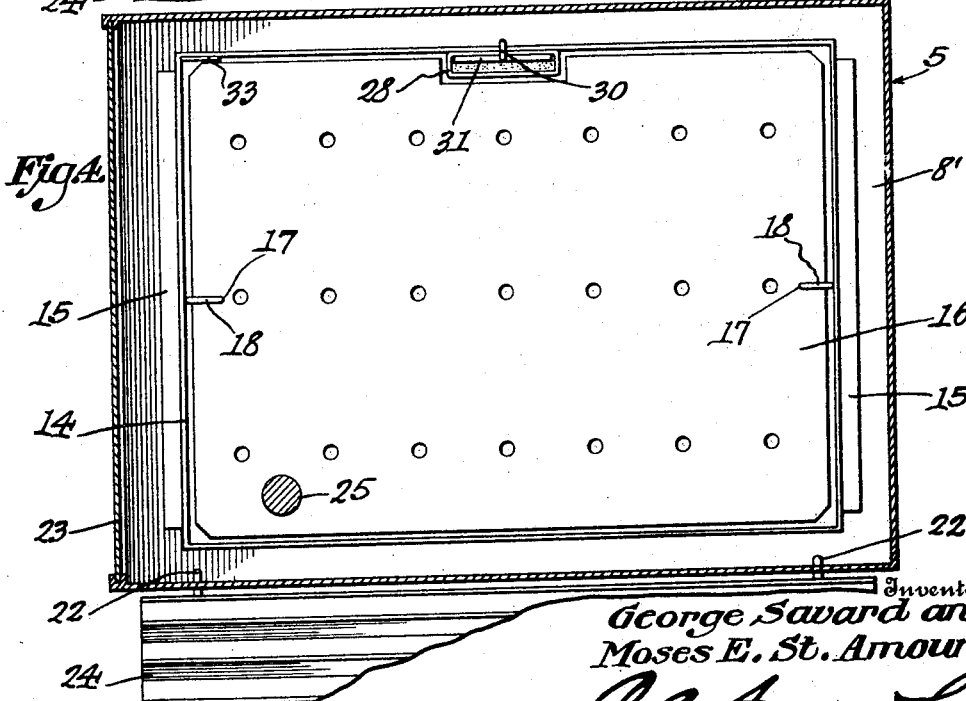

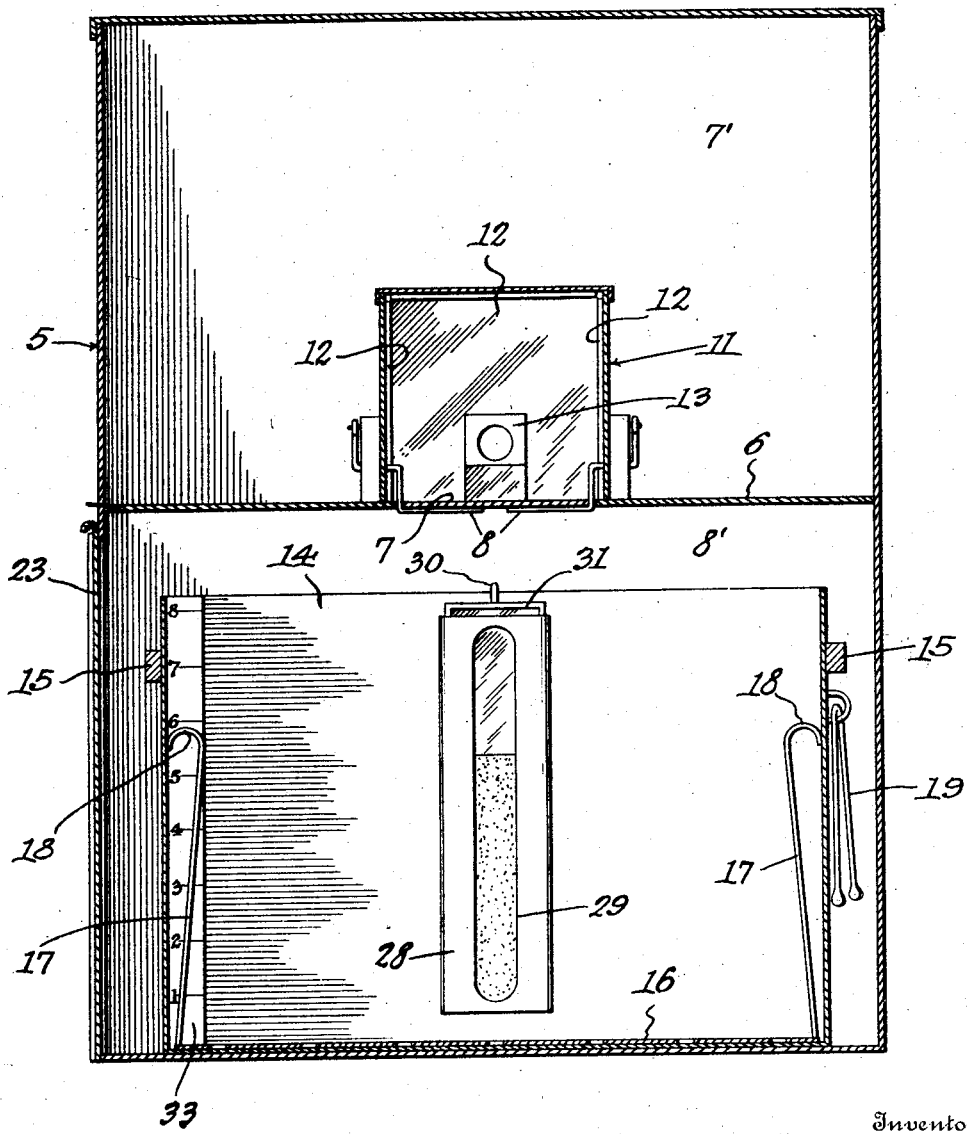

Patented Nov. 17, 1925.

1,561,800

UNITED STATES PATENT OFFICE.

GEORGE SAVARD AND MOSES E. ST. AMOUR, OF FAUST, NEW YORK, ASSIGNORS, BY DIRECT AND MESNE ASSIGNMENTS, OF ONE-HALF TO SAID GEORGE SAVARD AND ONE-HALF TO NAPOLEON GRENIER, OF FAUST, NEW YORK.

RAT TRAP.

Application filed May 17, 1924. Serial No. 714,100.

*To all whom it may concern:*

Be it known that we, GEORGE SAVARD and MOSES E. ST. AMOUR, citizens of the United States and Dominion of Canada, respectively, residing at Faust, in the county of Franklin and State of New York, have invented a new and useful Rat Trap, of which the following is a specification.

This invention relates to rat traps or the like and aims to provide a novel form of trap of the ever-set type so that a great number of rats may be caught before it is necessary to empty the trap.

Another important object of the invention is to provide novel means for attracting the rats to the interior of the trap or to such positions within the trap that they will fall into the water tank housed by the trap.

A still further object of the invention is to provide means for closing the trap after a predetermined number of rats have been caught, thereby eliminating any possibility of a rat escaping from the trap after it has once entered the same.

Another object of the invention is the provision of a trap which may be either operated to kill the rat by drowning, or by eating poison bait held in the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a trap constructed in accordance with the invention.

Figure 2 is a longitudinal sectional view through the trap, taken on line 2—2 of Figure 1.

Figure 3 is a sectional view taken on line 3—3 of Figure 1.

Figure 4 is a sectional view taken on line 4—4 of Figure 1.

Figure 5 is a sectional view taken on line 5—5 of Figure 3.

Referring to the drawings in detail, the reference character 5 indicates the body portion of the trap which may be constructed of any suitable material, however it is contemplated to employ sheet metal or the like for the sake of economy and sanitation.

A partitioning member indicated at 6 divides the body portion into an upper compartment 7' and a lower compartment 8', the partitioning member being formed with a suitable opening arranged substantially centrally thereof for establishing communication between the compartments 7' and 8'. A trap door indicated at 7 normally closes the opening in the partitioning member 6 and as shown, this trap door is mounted on the shaft 8, which is supported in suitable bearings disposed adjacent to the ends of the shaft. The shaft is formed with upwardly extended end portions having eyes that accommodate the inner ends of the coiled springs 9, the opposite ends of the coiled springs being anchored to the front wall of the body portion as at 9' to cause the springs to return the trap door to its initial or closed position after it has been operated to drop a rodent from the upper compartment to the lower compartment.

In order that the movement of the trap door to its closed position will be noiseless in its operation, a strip of rubber 10 is provided along the upper edge thereof, which rubber is designed to engage the partitioning member adjacent to the opening when the trap door 7 is returned to its initial position.

Arranged within the upper compartment and positioned on the partitioning member, is a housing indicated generally by the reference character 11, the walls of the housing being supplied with mirrors 12 so that a rodent upon entering the upper compartment will see his image in the various mirrors, making it appear as though other rodents are already in the trap, removing all care from the rodent to induce him to enter further.

The bait is positioned in the bait container indicated at 13, which is positioned within the confines of the housing 11, making it necessary for the rodent to pass directly over the trap door 7 in order to gain access to the bait. Positioned directly under the trap door is a removable tank 14 which may be of any suitable size and shape, the same being supplied with handles 15, whereby the tank may be readily and easily moved for emptying or cleaning purposes.

In order to facilitate the handling of the rodents caught in the trap, an auxiliary bottom member 16 is provided, which bottom member is in the form of a plate provided with a plurality of openings to allow the water in the tank to drain therethrough when the auxiliary bottom is being lifted from the tank. Arms 17 extend upwardly from the auxiliary bottom member and are supplied with curved extremities 18, which may be positioned over the upper edge of the tank to allow the water to drain therefrom. These hook portions 18 also provide means to permit the operator to place his fingers thereunder on lifting the auxiliary bottom from the tank.

It might be further stated that tongs such as indicated at 19 may be conveniently placed within the trap as for example hung on the handles 15 of the tank for removing the rodents from the auxiliary bottom and removing the necessity of the person touching the rodents with his hands to remove the same.

The front wall of the body portion 5 is provided with an opening 20 arranged above the partitioning member 6, which opening establishes communication between the upper compartment and the atmosphere to allow rodents to enter the upper compartment.

A run-way 21 is formed with hook members 22 which are adapted to hook into the body portion of the trap to permit rodents to pass upwardly into the upper compartment. The lower compartment also has its front wall supplied with an opening normally closed by the sliding closure 23 so that access to the interior of the lower compartment may be had for the removal of the tank and its contents.

The entrance opening formed in the front wall of the upper compartment is closed by means of the sliding closure 24, which is normally held open by means of the weight 25 that is in the form of a float designed to normally float on the surface of the water in the tank.

A flexible connecting member 26 connects the float 25 and sliding closure 24 and as shown, this flexible member 26 operates over the pulleys 27 supported within the upper compartment and mounted on the shafts extending from the wall thereof, the weight of the door being slightly greater than the weight of the float 25 so that when the float is released, the weight of the closure will cause it to move to its closing position.

It is to be understood that the opening in the partitioning member 6, through which the float or weight 25 moves, is relatively small so that a binding action will be set up between the float and walls of the opening to hold the float against movement until the water level in the tank contacts therewith to force the float from the opening.

A tubular supporting member 28 is secured to one wall of the tank and is provided with a cut out portion in the wall thereof to allow poisonous material to be inserted in the supporting member and be exposed to rodents passing into the trap. A mirror 31 is employed in connection with the supporting member and is provided with a hook member 30 adapted to be positioned on the rear wall of the supporting member to attract rodents to the poisonous material.

A gauge indicated at 33 is positioned in the tank so that persons on placing water in the tank may be guided as to the quantity of water to be placed therein and permit the operation of the trap door.

Thus it will be seen that as the tank becomes filled with rodents, the level of the water in the tank will rise causing the float to move upwardly and allowing the weight of the door to automatically move the same to its closed position. From the foregoing it will be obvious that rodents will pass up the run-way 21 and into the upper compartment to obtain the bait placed therein. As the rodents pass over the trap door 7, the trap door will be automatically opened allowing the rodents to fall into the water tank thereunder where they will be drowned.

It is believed that in view of the foregoing detailed description, a further detail description as to the operation of the trap is unnecessary.

We claim:—

1. A trap including a body portion, a partitoning member in the body portion dividing the body portion into upper and lower compartments, a trap door in the partitioning member and adapted to operate under the weight of an animal to drop the animal into the lower compartment, a closure for closing the upper compartment, a tank disposed in the lower compartment, a float in the tank, means for connecting the float and closure to cause the closure to move to its closed position when the float is elevated.

2. A trap including a body portion, a partitioning member dividing the body portion into upper and lower compartments, a pivoted trap member positioned in the partitioning member and adapted to drop an animal to the lower compartment, a closure for the upper compartment, means for normally holding the closure in its open position, said holding means adapted to release the closure when a predetermined number of animals have dropped into the lower compartment.

In testimony that we claim the foregoing as our own, we have hereto affixed our signatures.

GEORGE SAVARD.
MOSES E. ST. AMOUR.